United States Patent
Kim et al.

(10) Patent No.: US 12,438,808 B2
(45) Date of Patent: Oct. 7, 2025

(54) SEGMENT ROUTING-BASED MPLS PACKET FORWARDING METHOD AND DEVICE THEREOF

(71) Applicant: ELECTRONICS AND TELECOMMUNICATIONS RESEARCH INSTITUTE, Daejeon (KR)

(72) Inventors: Jeong Yun Kim, Daejeon (KR); Taesik Cheung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 418 days.

(21) Appl. No.: 18/125,843

(22) Filed: Mar. 24, 2023

(65) Prior Publication Data

US 2023/0308388 A1 Sep. 28, 2023

(30) Foreign Application Priority Data

Mar. 25, 2022 (KR) .......................... 10-2022-0037430

(51) Int. Cl.
*H04L 45/50* (2022.01)
*H04L 45/74* (2022.01)

(52) U.S. Cl.
CPC ............ *H04L 45/507* (2013.01); *H04L 45/74* (2013.01)

(58) Field of Classification Search
CPC .............................. H04L 45/507; H04L 45/74
See application file for complete search history.

(56) References Cited

U.S. PATENT DOCUMENTS

| | | | |
|---|---|---|---|
| 10,469,371 B2 | 11/2019 | Sitaraman et al. | |
| 2008/0137654 A1 | 6/2008 | Lee et al. | |
| 2009/0135833 A1 | 5/2009 | Lee et al. | |
| 2015/0256456 A1 | 9/2015 | Previdi et al. | |
| 2018/0205641 A1* | 7/2018 | Pignataro | H04L 45/38 |
| 2020/0358698 A1 | 11/2020 | Song et al. | |
| 2021/0092043 A1* | 3/2021 | Filsfils | H04L 45/64 |
| 2021/0135986 A1 | 5/2021 | Song et al. | |
| 2021/0306167 A1* | 9/2021 | Dutta | H04L 45/50 |
| 2022/0038364 A1* | 2/2022 | Du | H04L 45/34 |

* cited by examiner

*Primary Examiner* — Mansour Oveissi
(74) *Attorney, Agent, or Firm* — LRK PATENT LAW FIRM

(57) ABSTRACT

A segment routing-based MPLS packet forwarding method and a device thereof are proposed. The method includes establishing a forwarding path in a Multiple Protocol Label Switching (MPLS) network by receiving a packet, checking whether processing of a size of a label stack related to each node included in the forwarding path is available or not in each node, generating a first MPLS packet by adding an MPLS header having the label stack to the packet in response to availability of the processing, and generating a second MPLS packet by adding an extension header having the label stack and by adding an MPLS header having a part of the label stack allocated according to the label stack size processable by each node to the packet in response to unavailability of the processing.

20 Claims, 10 Drawing Sheets

SEGMENT ROUTING-BASED MPLS PACKET FORWARDING METHOD AND DEVICE THEREOF

CROSS REFERENCE TO RELATED APPLICATION

The present application claims priority to Korean Patent Application No. 10-2022-0037430, filed Mar. 25, 2022, the entire contents of which is incorporated herein for all purposes by this reference.

BACKGROUND OF THE INVENTION

1. Field of the Invention

The present disclosure relates to a segment routing-based Multiple Protocol Label Switching (MPLS) packet forwarding method and a device thereof and, more particularly, to an MPLS packet forwarding method and a device thereof for realizing error-free packet forwarding by segment routing in an MPLS network.

2. Description of Related Art

Segment routing fundamentally uses a source routing technology, and may represent a packet path between an ingress node and an egress node as a segment list for traffic path control. The ingress node adds the segment list representing a determined packet path to a header of a packet, and nodes on the path may forward the packet on the basis of the provided segment list.

In a segment routing-based MPLS (SR-MPLS) network, segment routing operates based on MPLS labels in a data plane and may have interoperability with existing IP/MPLS. A control plane supports label distribution merely with IGP (OSPF, ISIS), and does not require LDP and RSVP-TE protocols, whereby protocol operation may be simplified.

Segments are fundamentally classified into prefix segments, node segments, adjacency segments, and the like. Each adjacency segment may indicate an output interface through which a corresponding node forwards a packet to an adjacency node, thereby specifying a path between the arbitrary node and the adjacency node. The node segments are used to indicate segment routing nodes, and are connected through a plurality of nodes between an ingress node and an egress node. In a case where the ingress node adds just a segment of the egress node to a packet, a path between the ingress node and nodes placed before the egress node may be determined by a shortest path selection method. In a segment routing-based network, segments are encoded into MPLS labels, and a segment list may be encoded into an MPLS label stack.

In this case, a label stack size that may be processed by each node may be different depending on for each manufacturer of node routers. The label stack size at each node may be limited to a predetermined value. Accordingly, an ingress node needs to recognize in advance a maximum label stack size processable by the ingress node, intermediate nodes, and egress node, which are present on a path between the ingress node and the egress node. When a label stack size generated by the ingress node is greater than a maximum size of a label stack on a segment routing path, there may exist a node unable to process the label stack. For this reason, a forwarding error in which a packet is not delivered to a final destination may occur.

SUMMARY OF THE INVENTION

An objective of the present disclosure is to provide a segment routing-based MPLS packet forwarding method and a device thereof for realizing error-free packet forwarding by segment routing in an MPLS network.

The technical problems to be achieved in the present disclosure are not limited to the technical problems mentioned above, and other technical problems that are not mentioned will be clearly understood by those skilled in the art to which the present disclosure belongs from the following description.

According to one aspect of the present disclosure, there is provided a segment routing-based MPLS packet forwarding method, including: establishing a forwarding path in a Multiple Protocol Label Switching (MPLS) network by receiving a packet; checking whether processing of a size of a label stack related to each node included in the forwarding path is available or not in each node; generating a first MPLS packet by adding an MPLS header having the label stack to the packet in response to availability of the processing; and generating a second MPLS packet by adding an extension header having the label stack and by adding an MPLS header having a part of the label stack allocated according to the label stack size processable by each node to the packet in response to unavailability of the processing.

According to another exemplary embodiment of the present disclosure, each of the MPLS headers of the first and second MPLS packets may be configured such that a label value of each node is arranged along the forwarding path in the label stack of each MPLS header, and the extension header may be configured such that the label value is arranged along the forwarding path in the label stack of the extension header.

According to a yet another exemplary embodiment of the present disclosure, each of the MPLS headers of the first and second MPLS packets may be configured to include: the label stack loaded for each MPLS header; and forwarding control information having egress node information of the label stack and time-to-live information of each node.

According to a still another exemplary embodiment of the present disclosure, the segment routing-based MPLS packet forwarding method may further include: determining whether re-establishment of the forwarding path is available on the basis of the label stack size processable by each node in response to the unavailability of the processing; generating the first MPLS packet by re-establishing the forwarding path in response to availability of the re-establishment; and generating the second MPLS packet in response to unavailability of the re-establishment.

According to a still another exemplary embodiment of the present disclosure, the segment routing-based MPLS packet forwarding method may further include: determining whether the generating of the second MPLS packet is available before the generating of the second MPLS packet; and discarding the packet in response to unavailability of the generating of the second MPLS packet.

According to a still another exemplary embodiment of the present disclosure, the segment routing-based MPLS packet forwarding method may further include: forwarding any one of the first and second MPLS packets along each intermediate node on the forwarding path, and receiving to process any one MPLS packet by each intermediate node. The processing of the MPLS packet may include: checking, by each intermediate node, whether the extension header exists in the received MPLS packet; processing the first MPLS packet, so as to delete a label value of each intermediate node receiving the first MPLS packet within the label stack of the MPLS header included in the first MPLS packet in response to absence of the extension header; and processing the second MPLS packet, so as to delete a label value of each intermediate node receiving the second MPLS packet within the label stack of the MPLS header by referring to the MPLS header included in the second MPLS packet in response to existence of the extension header.

According to a still another exemplary embodiment of the present disclosure, the processing of the second MPLS packet may include: processing to have a label value related to a subsequent node on the forwarding path in the label stack of the MPLS header on the basis of the label stack size processable by each receiving intermediate node and the label stack of the extension header.

According to a still another exemplary embodiment of the present disclosure, the processing of the second MPLS packet may further include adding, to the MPLS header, a subsequent node indicator related to a next intermediate node along the forwarding path. The processing of the second MPLS packet may further include changing the subsequent node indicator so as to indicate a subsequent node on the forwarding path.

According to a still another exemplary embodiment of the present disclosure, the subsequent node indicator may be changed by referring to stack indexes matching the respective nodes loaded in the label stack of the extension header.

According to a still another exemplary embodiment of the present disclosure, the generating of the second MPLS packet may further include adding forwarding control information and an additional label stack indicating the existence of the extension header. The forwarding control information may include traffic class information, bottom-of-stack information representing that the additional label stack corresponds to a last stack, and additional time-to-live information. The traffic class information and the additional time-to-live information may serve as at least one of transmission type information and a subsequent node indicator individually or in combination thereof.

According to another aspect of the present disclosure, there is provided an ingress router of an MPLS network, the ingress router including: an ingress transceiver configured to receive a packet and forward an MPLS packet generated based on the packet; and an ingress processor configured to process the packet and the MPLS packet. The ingress processor may be configured to establish a forwarding path in the Multiple Protocol Label Switching (MPLS) network by receiving the packet, check whether processing of a size of a label stack related to each node included in the forwarding path is available or not in each node, generate a first MPLS packet by adding an MPLS header having the label stack to the packet in response to availability of the processing, and generate a second MPLS packet by adding an extension header having the label stack and by adding an MPLS header having a part of the label stack allocated according to the label stack size processable by each node to the packet in response to unavailability of the processing.

According to a yet another aspect of the present disclosure, there is provided an intermediate router provided between an ingress node and an egress node in an MPLS network, the intermediate router including: an intermediate transceiver configured to transmit and receive an MPLS packet; and an intermediate processor configured to process the MPLS packet. The intermediate processor may be configured to check whether an extension header exists in a received MPLS packet in order to identify whether the received MPLS packet is a first MPLS packet or a second MPLS packet, process the first MPLS packet, so as to delete a label value of each intermediate node in a label stack of an MPLS header included in the first MPLS packet in response to identifying of the first MPLS packet in which the extension header is absent, and process the second MPLS packet, so as to delete a label value of each intermediate node in a label stack of an MPLS header by referring to the MPLS header included in the second MPLS packet in response to identifying of the second MPLS packet in which the extension header is present. The MPLS header of the first MPLS packet may have the label stack allocated with a size of the label stack related to each node included in a forwarding path. The MPLS header of the second MPLS packet may include a part of the label stack allocated according to the label stack size processable by each node. The extension header may have the label stack.

Features briefly summarized above with respect to the present disclosure are only exemplary aspects of the detailed description of the present disclosure described below, and do not limit the scope of the present disclosure.

According to the present disclosure, the segment routing-based MPLS packet forwarding method and the device thereof for realizing error-free packet forwarding by segment routing in the MPLS network may be provided.

According to the present disclosure, an MPLS label stack size processable by the nodes on a packet forwarding path is pre-checked and applied to determine whether to add an MPLS extension header on the basis of the result of the pre-checking, thereby preventing in advance packet forwarding failures that may occur in the process of forwarding MPLS packets in the segment routing-based MPLS network.

In addition, according to the present disclosure, the label values related to the nodes on the forwarding path are copied into the label stack in consideration of the label size processable by each node, thereby enabling high-speed processing for packet forwarding by the intermediate nodes.

Furthermore, according to the present disclosure, the forwarding method of a packet may be dynamically determined by referring to the label stack size processable by each node participating in the forwarding path.

The effects of the present disclosure are not limited to the above-mentioned effects, and other different effects that are not mentioned will be clearly understood by those skilled in the art from the following description.

DETAILED DESCRIPTION OF THE INVENTION

Figure 1:
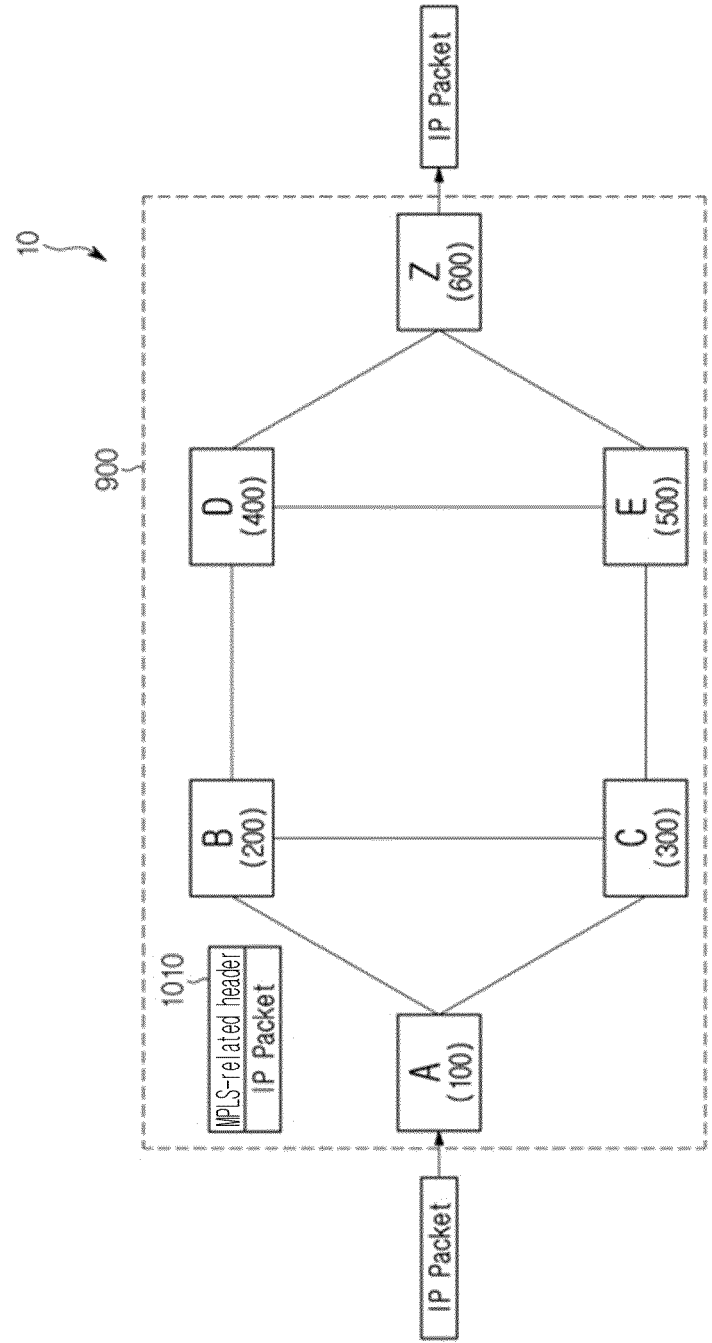
FIG. 1 is an exemplary view of a segment routing-based MPLS network for describing the present disclosure.

Hereinafter, exemplary embodiments of the present disclosure will be described in detail with reference to the accompanying drawings so that those skilled in the art can easily implement the present disclosure. However, the present disclosure may be implemented in various different forms and is not limited to the exemplary embodiments described herein.

In describing the exemplary embodiment of the present disclosure, when it is determined that a detailed description of a known configuration or function may obscure the subject matter of the present disclosure, the detailed description thereof will be omitted. In addition, parts not related to the description of the present disclosure in the drawings are omitted, and similar reference numerals are used to similar parts.

In the present disclosure, when a component is said to be "connected", "coupled" or "linked" with another component, this may include not only a direct connection, but also an indirect connection in which another component exists in the middle therebetween. In addition, when a component "includes" or "has" other components, it means that other components may be further included rather than excluding other components unless the context clearly indicates otherwise.

In the present disclosure, terms such as first and second are used only for the purpose of distinguishing one component from other components, and do not limit the order, importance, or the like of components unless otherwise noted. Accordingly, within the scope of the present disclosure, a first component in one exemplary embodiment may be referred to as a second component in another exemplary embodiment, and similarly, a second component in one exemplary embodiment may also be referred to as a first component in another exemplary embodiment.

In the present disclosure, components that are distinguished from each other are intended to clearly describe each of their characteristics, and do not necessarily mean that the components are separated from each other. That is, a plurality of components may be integrated into one hardware or software unit, or one component may be distributed to be configured in a plurality of hardware or software units. Therefore, even when not stated otherwise, such integrated or distributed exemplary embodiments are also included in the scope of the present disclosure.

In the present disclosure, components described in various exemplary embodiments do not necessarily mean essential components, and some may be optional components. Accordingly, an exemplary embodiment consisting of a subset of components described in an exemplary embodiment is also included in the scope of the present disclosure. In addition, exemplary embodiments including other components in addition to the components described in the various exemplary embodiments are included in the scope of the present disclosure.

Hereinafter, exemplary embodiments of the present disclosure will be described with reference to the accompanying drawings.

FIG. 1 is an exemplary view of a segment routing-based MPLS network for describing the present disclosure.

In an SR domain 900, a segment routing-based MPLS network system 10 may be configured to include an ingress node 100, intermediate nodes 200 to 500, and an egress node 600. The segment routing (SR) domain 900 may mean that segment routing is applied to a network or domain of MPLS. Specifically, the SR domain 900 may be composed of a set of nodes 100 to 600 to which an IP packet is converted into an MPLS packet and forwarded so that MPLS network protocols are applied. The nodes may execute reception, forwarding, and transmission procedures in the SR domain 900. Here, the network and the domain are used in the same meaning, and the SR domain may be described interchangeably with the MPLS network 900 in the present disclosure. In addition, for convenience of description, the present disclosure mainly describes a method of converting the IP packet into the MPLS packet and forwarding the MPLS packet, but other than the IP packet, a packet to be converted into an MPLS packet may be a packet that is implemented by a plurality of transport protocols such as SDH and Ethernet.

The ingress node 100 may receive an IP packet, generate an MPLS packet by a predetermined protocol, and forward the MPLS packet to the egress node 600 via the intermediate nodes 200 to 500. The IP packet may include, for example, payload data and an IP header. The IP header may be configured to include final destination node information and transport protocols, such as TCP and/or UDP protocols, in a typical IP packet network other than the SR domain 900. The ingress node 100 may be operated by an ingress router (hereinafter, used interchangeably with an ingress node). The ingress router is a type of device configured to generate and forward MPLS packets. The ingress router may include an ingress transceiver (not shown) configured to receive packets and forward the MPLS packets generated on the basis of the packets, and an ingress processor (not shown) configured to process the packets and the MPLS packets. For convenience of description, the functions and operations of the ingress transceiver and ingress processor will be collectively referred to as those of the ingress node.

The ingress node 100 may establish a forwarding path (e.g., 700 or 800 in FIG. 3) within the MPLS network 900 by receive an IP packet. The ingress node 100 may check whether processing of the size of a label stack related to the nodes 100 to 600 included in the forwarding path 700 or 800 is available in each node 100 to 500. Here, the label stack may be generated based on a segment list loaded with segment values of the nodes 100 to 600 on the forwarding path. The segment values may be forwarding commands for controlling a packet to pass through the nodes of the forwarding path (700 or 800 in FIG. 3) in a network topology. The ingress node 100 may generate the segment list on the basis of the forwarding path. The label stack may be composed of a list loaded with label values of nodes 100 to 600 mapped with the segment values according to a predetermined rule. In the description below, referring to a label value may mean that not only the label value is referred to directly, but also the segment list is referred to by using the label value. In the present disclosure, for convenience of description, in some cases, the label value and the segment value may be described with the same meaning.

In a case where the above-described processing is available in each node, the ingress node 100 may generate a first MPLS packet by adding an MPLS header having a label stack to a packet. In a case where the above-described processing is unavailable in at least one of each node 100 to 500, the ingress node 100 may generate a second MPLS packet by adding, to the IP packet, an extension header having a label stack corresponding to the entire size of the label stack and an MPLS header having a part of the label stack allocated according to the label stack size actually processable by the nodes 100 to 500. The process of generating the first MPLS packet at the ingress node 100 will be described below with reference to FIGS. 2 to 4B. In addition, the process of generating the second MPLS packet at the ingress node 100 will be described with reference to FIGS. 2 and 5 to 7B.

The intermediate nodes 200 to 500 are provided between the ingress node 100 and the egress node 600 to receive and process an MPLS packet, and may forward the MPLS packet to subsequent nodes by referring to label stack information of the MPLS packet.

The intermediate nodes 200 to 500 may identify whether the MPLS packet is a first MPLS packet or a second MPLS packet by checking whether an extension header exists in the received MPLS packet. In a case of confirming that the received MPLS packet does not have the extension header and is identified as the first MPLS packet, the intermediate nodes 200 to 500 may process the first MPLS packet, so as to delete a label value, corresponding to an intermediate node receiving the MPLS packet, in the label stack of the MPLS header included in the first MPLS packet. In a case of confirming that the received MPLS packet is identified as the second MPLS packet including the extension header, the intermediate nodes 200 to 500 may process the second MPLS packet, so as to delete a label value, corresponding to the intermediate node receiving the MPLS packet, in the label stack of the MPLS header by referring to the MPLS header and the extension header. By referring to the label values of the subsequent nodes in the first and second MPLS packets from which the label values have been deleted, the intermediate nodes 200 to 500 may check a segment value related to a subsequent label value and select an output interface on the basis of the segment value. Here, the subsequent node may mean a destination node next to the node receiving the MPLS packet on the forwarding path.

Unlike other intermediate nodes 200 to 400, when the intermediate node 500 in front of the egress node 600 checks, through the MPLS header, a specific label value, e.g., a segment value corresponding to a label value of the egress node 600, the intermediate node 500 may delete the MPLS header and/or the extension header. For example, the intermediate node 500 may check egress node information (i.e., S=1 in FIGS. 4A, 4B, 7A, and 7B) included in the MPLS header (1052 in FIGS. 4A and 4B), thereby recognizing that the label value of a subsequent node is related to the egress node 600. As another example, the intermediate node 500 may check that the subsequent node is the egress node 600 through a stack index included in an extension header (1064 of FIGS. 7A and 7B) of each of the MPLS packets 1300 and 1300*a* illustrated in FIGS. 5 and 6. The stack index may correspond to [0] in "[0] 600" illustrated in the extension header 1064 of FIGS. 5 and 6. "600" may be the label value of the egress node 600.

The intermediate nodes 200 to 400 may be controlled by an intermediate router (hereinafter, used interchangeably with the intermediate node). The intermediate router is a type of device for forwarding MPLS packets. The intermediate router may include an intermediate transceiver (not shown) configure to forward and receive the MPLS packets and an intermediate processor (not shown) configure to process the MPLS packets. For convenience of description, the functions and operations of the intermediate transceiver and intermediate processor will be collectively referred to as those of the intermediate node.

The egress node 600 is the destination node of the MPLS network 900 connected to a non-SR domain, and may forward an IP packet by referring to an address of a final destination node of the IP packet. The egress node 600 may be operated by an egress router.

Detailed operations of the ingress node 100 controlled by the ingress router, the intermediate nodes 200 to 500 operated by the intermediate routers, and the egress node 600 will be described with reference to FIGS. 2 to 8.

Figure 2:
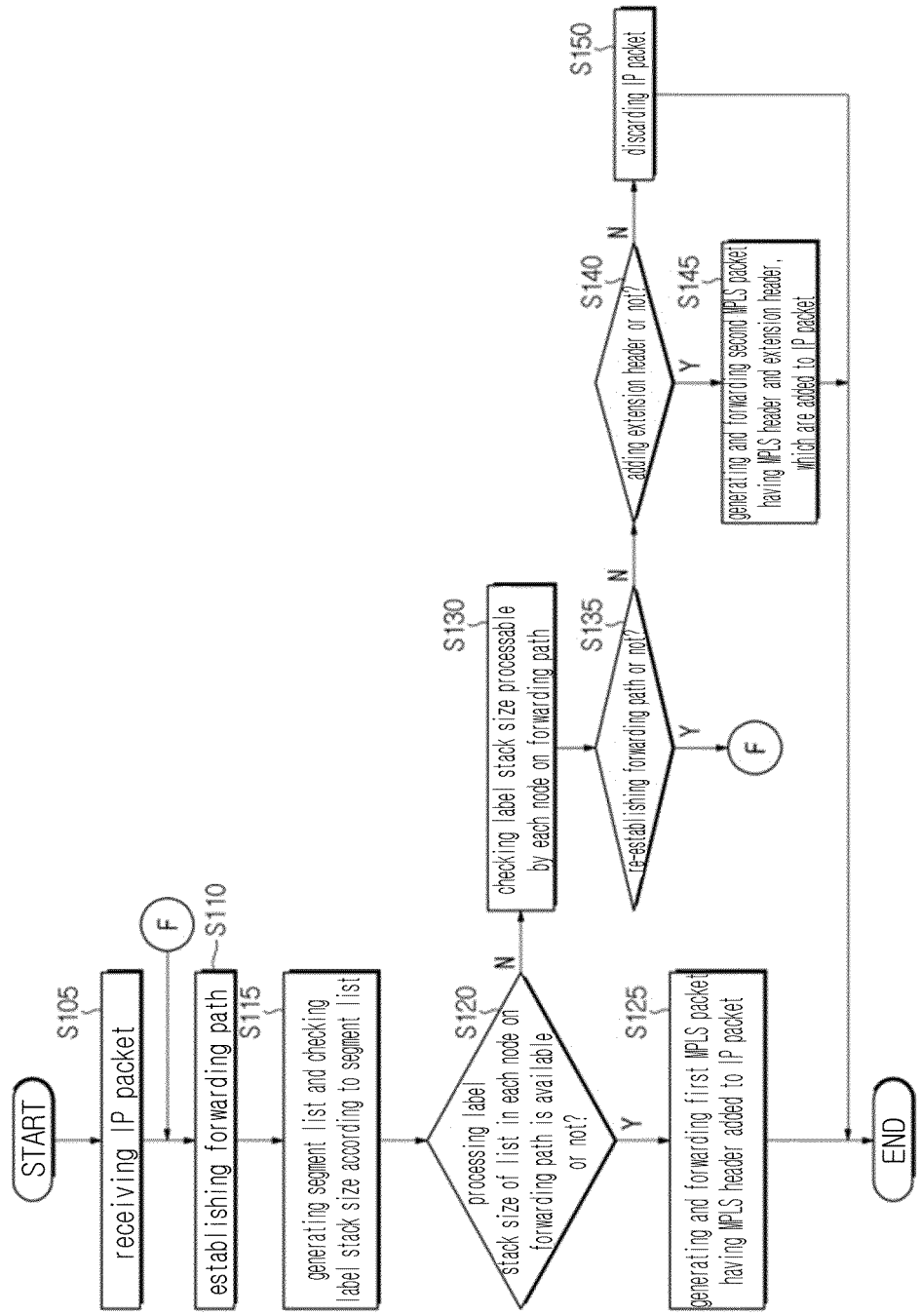
FIG. 2 is a flowchart of a segment routing-based MPLS packet forwarding method performed in an ingress router according to an exemplary embodiment of the present disclosure.

FIG. 2 is a flowchart of an MPLS network-based segment routing method performed in the ingress router according to the exemplary embodiment of the present disclosure.

First, in step S105, an ingress node 100 may receive an IP packet received from outside an MPLS network 900.

In the present disclosure, an example in which a received packet is the IP packet is described, but is not limited thereto, and packets defined by various transport protocols may be applied to the received packet.

Next, in step S110, the ingress node 100 may establish a forwarding path for forwarding the packet to an egress node 600.

Figure 3:
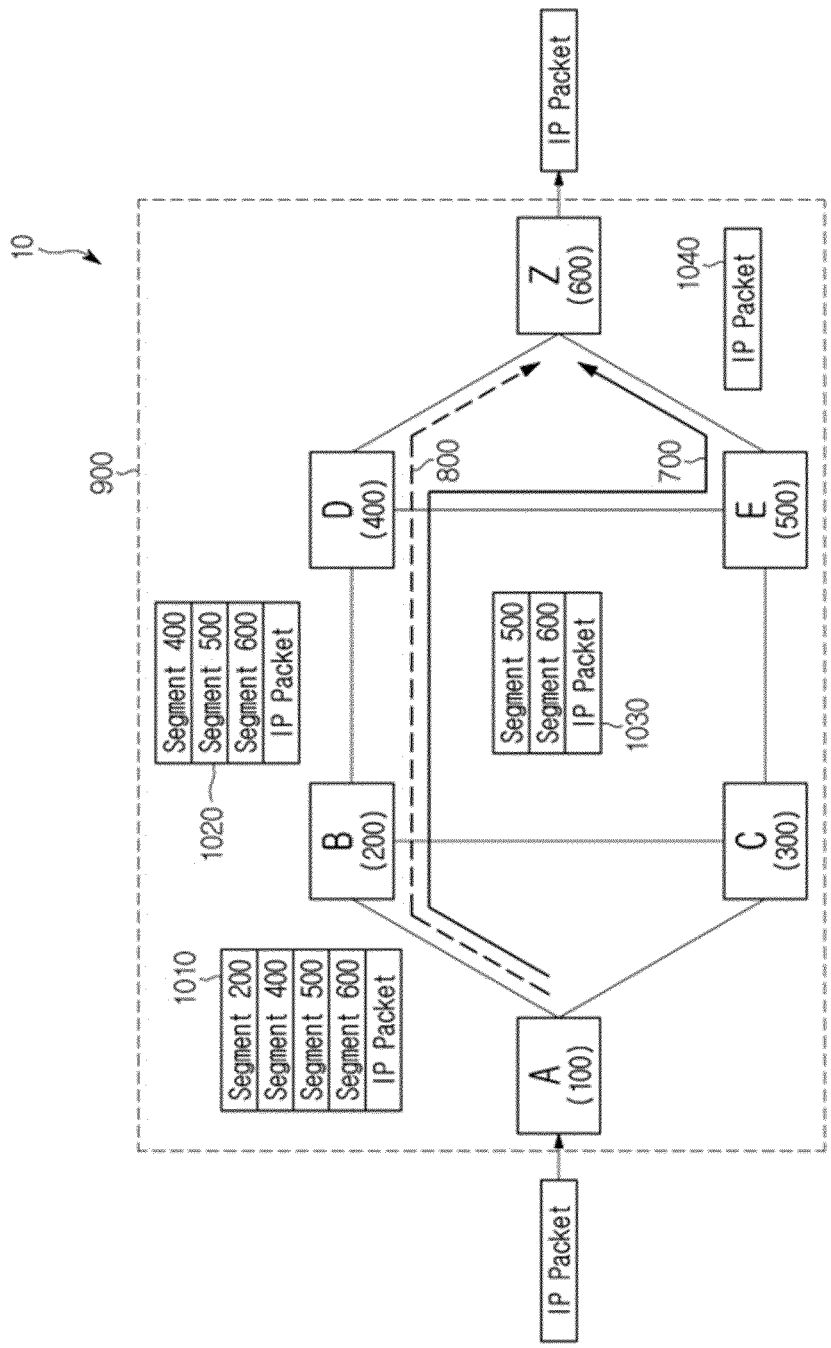
FIG. 3 is a view illustrating generation and processing of a first MPLS packet in the MPLS network.

Specifically, the ingress node 100 may establish the forwarding path by referring to routing information of the MPLS network 900 and related information such as source/destination IP addresses and ports, which are included in an IP header of the IP packet. The establishment of the forwarding path may be performed, for example, by either a method of generating a forwarding path when an ingress node 100 receives an IP packet or a method of selecting a forwarding path set by an ingress node 100 before receiving an IP packet. The routing information includes topology, access information, and the like of the nodes 100 to 600 included in the MPLS network 900, and the ingress node 100 may collect the routing information including the aforementioned information. In the present disclosure, as illustrated in FIG. 3, a path indicated by reference numeral 700 connected to nodes A-B-D-E-Z 100, 200, 400, 500, and 600 may be designated as the forwarding path. The ingress node 100 may collect information in advance, such as the routing information of the MPLS network 900 and a label stack size of each node. The ingress node may generate packet path information on the basis of this information.

Next, in step S115, the ingress node 100 may generate a segment list composed of the nodes 200, 400, 500, and 600 of the forwarding path 800, and check a label stack size according to the segment list.

The segment list may be, for example, a list loaded with segment values of the nodes 200, 400, 500, and 600 along the forwarding path 800. For example, the ingress node 100 may convert the segment list into a label stack. The label values of the nodes 200, 400, 500, and 600 included in the label stack may be mapped to the segment values according to a predetermined rule. The ingress node 100 may check the label stack size and a segment list size by analyzing the label stack. In the present disclosure, for convenience of description, a label value and a segment value may be described with the same meaning in some cases. In addition, the label stack size and the segment list size may be described with the same meaning in some cases.

Hereinafter, for easy understanding, it is exemplified that a label value is a reference numeral of each node. Exemplarily, the ingress node 100 may check that the label stack size is 4 by retrieving the label values 200, 400, 500, and 600 of the label stack represented as a part of an MPLS packet 1010 illustrated in FIG. 3.

Subsequently, in step S120, the ingress node 100 may determine whether the nodes 100, 200, 400, 500, and 600 on the forwarding path 700 are able to process the label stack size generated in step S115.

For example, a maximum label stack size actually processable in each node 100, 200, 400, 500, and 600 is checked in advance, so that the ingress node 100 may recognize the maximum size. Since the maximum label stack size is different for each router manufacturer, each router may distribute a processable size to each node in advance. Accordingly, the node, which functions as the ingress node 100, may predefine the maximum label stack size on the basis of the processable size of each node. As another example, the ingress node 100 may request the nodes 200, 400, 500, and 600 on the forwarding path 700 to receive information on size actually processable by each node 200, 400, 500, and 600, and may determine a maximum size on the basis of the received information. The actual processable size may vary depending on various situations of each node 200, 400, 500, and 600, and when receiving an IP packet, the ingress node 100 may determine the maximum size.

When the ingress node 100 checks that the label stack size generated in step S115 does not exceed the maximum label stack size, the ingress node 100 may determine that the label stack size may be processed in the nodes 200, 400, 500, and 600 on the forwarding path 700. Describing the label stack size in step S115 as an example, in a case of a label stack size and a maximum size, each having a size of 4, the ingress node 100 may determine that the label stack size does not exceed the maximum label stack size.

Unlike this, in a case where a label stack size is 4 and a maximum size is 3, when the ingress node 100 checks that the label stack size exceeds the maximum label stack size, the ingress node 100 may determine that the label stack size may not be processed in the nodes 200, 400, 500, and 600 on the forwarding path 700.

In a case where the ingress node 100 determines that a label stack size is processable, the ingress node 100 may generate, in step S125, a first MPLS packet 1010 by adding an MPLS header having a label stack to an IP packet and forward the first MPLS packet to a subsequent node.

Figure 4A:
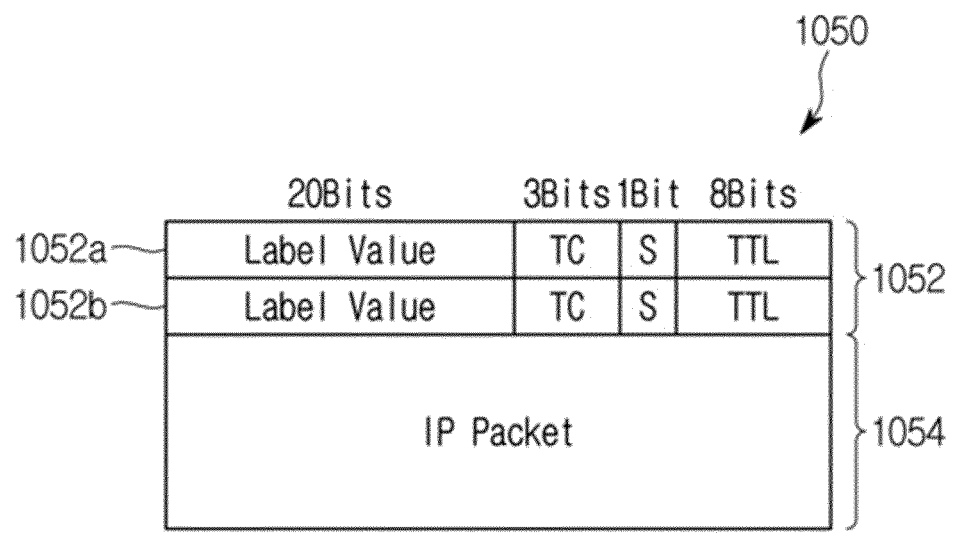
FIG. 4A is a view illustrating a structure of the first MPLS packet.

FIG. 4A is a view illustrating a structure of the first MPLS packet.

Referring to FIG. 4A to describe the first MPLS packet 1050 in detail, the first MPLS packet 1050 may be composed of an MPLS header 1052 and an IP packet 1054.

The MPLS header 1052 may have label stack entries 1052*a* and 1052*b* related to nodes along a forwarding path. Each of the label stack entries 1052*a* and 1052*b* may be configured to include an individual label value constituting a label stack along the forwarding path and forwarding control information. Each label value may include information for determining a location to which the first MPLS packet 1050 is to be forwarded in each node. The label values of the nodes may be arranged along the forwarding path in the label stack.

The forwarding control information may have traffic class information TC, egress node information in a label stack, and time-to-live information of a node. The traffic class information TC may be used to set a priority to apply to labeled packets in QoS. The egress node information causes identifying of whether a receiving node is the egress node of the forwarding path or not, whereby whether there exists a subsequent label value or not may be recognizable. The egress node information may be, for example, a Bottom-of-Stack (BoS) field. In FIG. 4A, when S, which is a field indicating the egress node information, is set to a value of 1, this field value indicates that a node related to the corresponding label value is the last entry in a label stack, so it may be recognized that the corresponding node is the egress node. When setting is made as S=0, this field value may indicate that a corresponding node is not the egress node. The time-to-live information TTL may provide the number of possible hops before the first MPLS packet is destroyed in each node. As another example, the time-to-live information TTL may be a kind of remaining time information. In the MPLS network 900, values assigned to traffic class TC and time-to-live information TTL and a processing method thereof may be defined in advance at the ingress node, intermediate nodes, and egress node.

An IP packet 1054 may include, for example, payload data and an IP header.

Figure 4B:
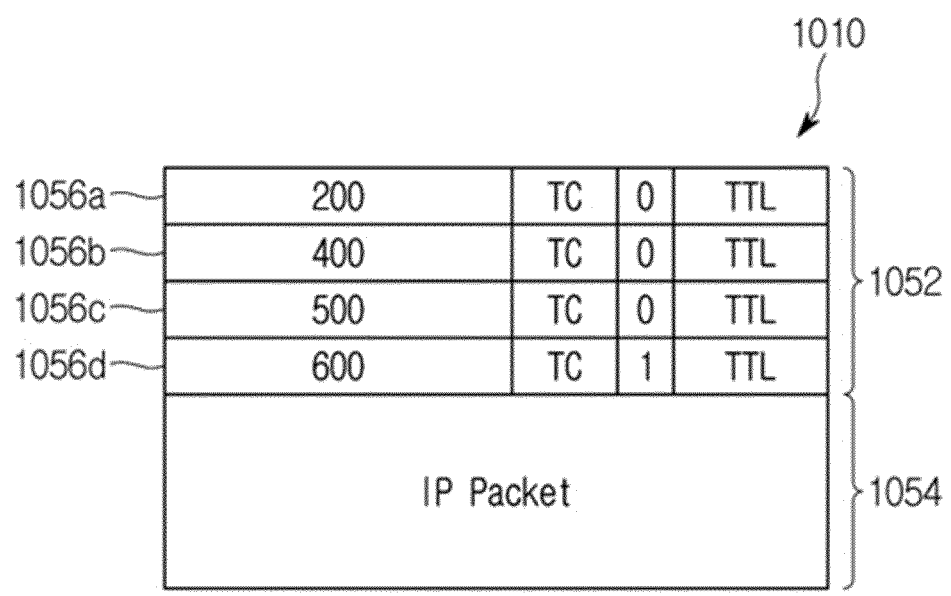
FIG. 4B is a view illustrating a specific example of the first MPLS packet generated by an ingress router in FIG. 3.

For ease of understanding, as illustrated in FIGS. 3 and 4B, by exemplifying that a label stack size along the forwarding path 700 is 4, the first MPLS packet 1010 generated by the ingress node 100 will be described.

FIG. 3 is a view illustrating generation and processing of a first MPLS packet in the MPLS network. FIG. 4B is a view illustrating a specific example of the first MPLS packet generated by an ingress router in FIG. 3.

An MPLS header 1052 may have label stack entries 1056*a* to 1056*d* respectively assigned with label values 200, 400, 500, and 600. Each of the label stack entries 1056*a* to 1056*d* may be generated to have a label value, traffic class information TC, egress node information where S is set to 0 or 1, and time-to-live information TTL. Here, the label values of the nodes 200, 400, 500, and 600 may be arranged as 200-400-500-600 along the forwarding path 700 in a label stack. In addition, since the bottommost label value 600 of the label stack, i.e., the egress node information corresponding to the node 600, is set to 1, it may be recognized that the node 600 is the last node of the label stack and is the egress node.

As illustrated in FIG. 4B, the ingress node 100 may generate a first MPLS packet 1010 by adding an MPLS header 1052 having four label values to an IP packet 1054.

Referring back to step S120 of FIG. 2, when the ingress node 100 determines that a label stack size is not processable through each of the nodes 100, 200, 400, 500, and 600, the label stack size actually processable in the nodes 200, 400, 500, and 600 of the forwarding path 700 may be rechecked in step S130.

For example, the ingress node 100 may recheck the maximum label stack size already recognized in step S120. As another example, the ingress node 100 may receive actual processable size information of each node 200, 400, 500, and 600 by requesting the information from the nodes 200, 400, 500, and 600 on the forwarding path 700, and determine the maximum label stack size on the basis of the received information.

Next, in step S135, the ingress node 100 may determine whether re-establishment of the forwarding path is possible or not on the basis of the re-checked maximum label stack size.

As illustrated in step S115, in a case where a maximum label stack size is 3, the ingress node 100 may search for a forwarding path and nodes, which satisfy the maximum label stack size. For example, the ingress node 100 may determine whether to re-establish the forwarding path conforming to the size by collecting routing information such as a topology and access information of the nodes 100 to 600 included in the MPLS network 900.

When nodes and a forwarding path, which satisfy the above size, are present, the ingress node 100 may re-establish the forwarding path according to the size-satisfied nodes. As illustrated in FIG. 3, re-establishment may be made such that the nodes satisfying the maximum label stack size of 3 are the nodes A-B-D-Z 100, 200, 400, and 600, and the path composed of the nodes 100, 200, 400, and 600 is the forwarding path 800.

The ingress node 100 may sequentially generate a segment list, a label stack, and a first MPLS packet on the basis of the nodes 100, 200, 400, and 600 of the re-established forwarding path 800. The process of generating the first MPLS packet according to the re-established forwarding path 800 may be performed substantially the same as steps S115 to S125.

In a case where the ingress node 100 is unable to re-establish a forwarding path because there is no node and forwarding path that satisfies the re-checked maximum label stack size, the ingress node 100 may determine, in step S140, whether to add an MPLS header and an extension header to an IP packet 1054.

In a case where the MPLS header and the extension header are addable to the IP packet 1054, the ingress node 100 may generate, in step S145, a second MPLS packet in which the MPLS header and extension header are included in the IP packet, and forward the second MPLS packet to a subsequent node.

Figure 5:
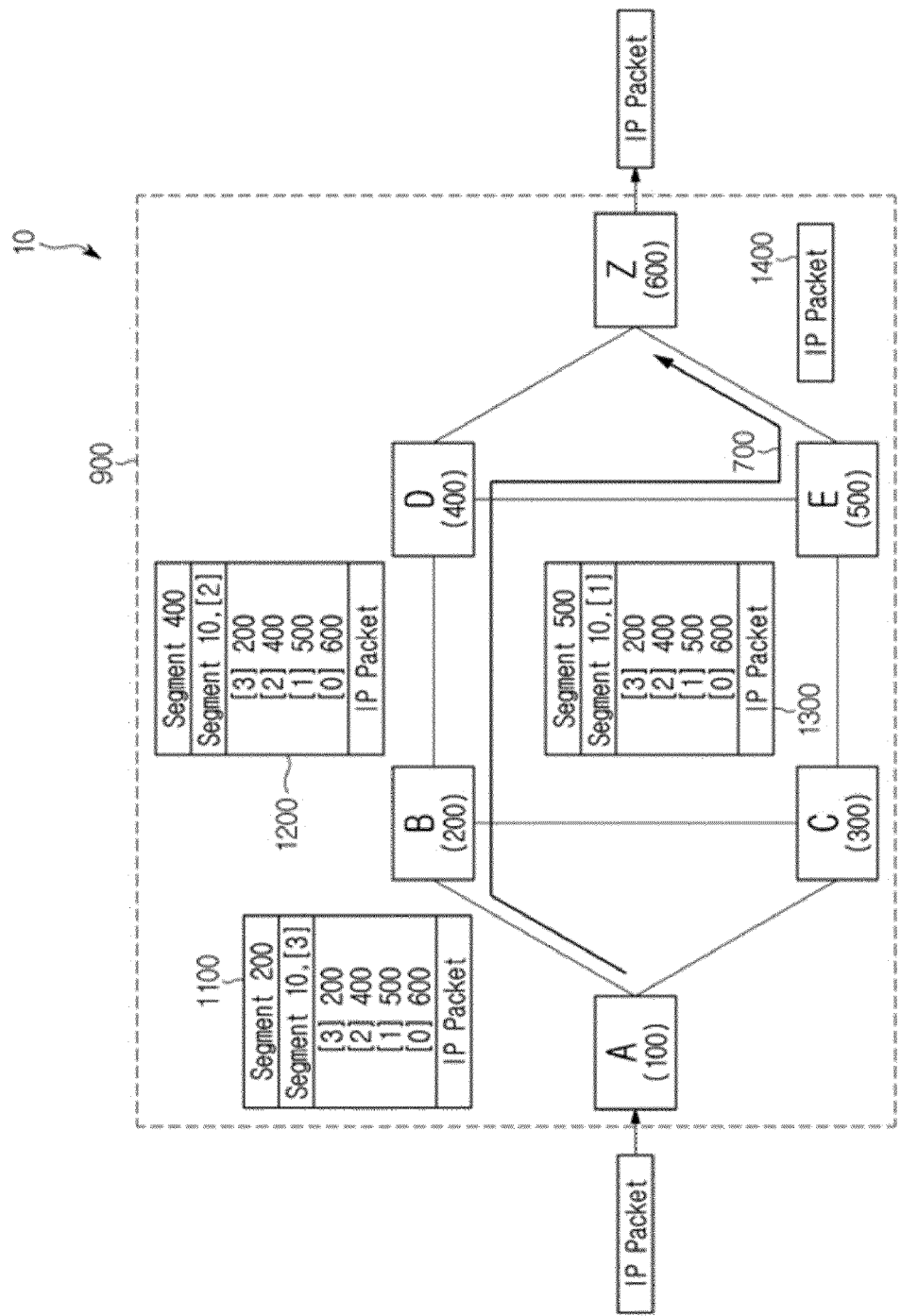
FIG. 5 is a view illustrating generation and processing of a second MPLS packet in the MPLS network when a label stack size of a node is 2.

Step S145 will be described in detail with reference to FIGS. 5 to 7B. FIG. 5 is a view illustrating generation and processing of the second MPLS packet in the MPLS network when a node has a label stack size of 2.

The MPLS header and extension header may be generated by referring to the segment list generated in step S115. The extension header may be used to transport stack information, regardless of a label stack size processable by the nodes on the forwarding path 700. Accordingly, the extension header may be configured to have the label stack including all the nodes 200, 400, 500, and 600 of the forwarding path 700 related to the segment list. The MPLS header may be configured to have a part of the label stack allocated according to the label stack size processable in the nodes 100, 200, 400, 500, and 600 of the forwarding path 700, that is, according to the maximum label stack size. The part of the label stack means a part of the nodes related to the segment list, and the MPLS header includes at least a subsequent node after a current node, and may be generated to include a series of nodes following the subsequent node so as to have an array of label values according to the maximum label stack size.

For ease of understanding, as illustrated in FIG. 5, a case where segment values of the nodes B, D, E, and Z 200 to 600 along the forwarding path 700 are respectively 200, 400, 500, and 600 and a label stack size is 4 will be described as an example. In addition, a description through FIG. 5 illustrates that a maximum label stack size actually processable by each node is fixed to 2.

As illustrated in FIG. 5, in consideration of the maximum label stack size of 2, an MPLS header 1100 generated by the ingress node 100 may be generated to include a label value of 200 indicating an adjacent node from among segment values 200-400-500-600 of the segment list, and a label value, e.g., 10, indicating a special purpose. Accordingly, a label stack of the MPLS header 1100 may include label values corresponding to a part of the nodes 200, 400, 500, and 600 of the segment list. Here, the adjacent node may be a subsequent node as a next node to which a second MPLS packet is to be transported by a current node. The special-purpose label value may be an additional label value 1072 illustrated in FIG. 7A, and may cause the intermediate nodes 200, 400, and 500 to recognize the existence of an extension header. In addition, the special-purpose label value may be a label value indicating a special purpose related to segment routing, network programming, and the like.

In addition, each of the label values 200 and 10 may be sequentially arranged in the label stack according to the forwarding path 700. In detail, the label value 200 indicating a subsequent node may be arranged at the topmost of the label stack in the MPLS header 1100. In addition, the special-purpose label value 10 and a subsequent node indicator, e.g., [3], may be arranged at the bottommost of the label stack in the MPLS header 1100. The subsequent node indicator is a value that is set in additional time-to-live information TTL 1078 illustrated in FIG. 7A, and may be changed in the process of forwarding the second MPLS packet toward the egress node 600. For example, the subsequent node indicator may be changed by referring to stack indexes [0] to [3] of the extension header 1064 illustrated in FIG. 7B.

Specifically, the label stack of the MPLS header 1062 may include the subsequent node indicator indicating a position of the topmost label value in the label stack of the extension header. Since the topmost label value is related to a subsequent node, the indicator may be referred to as the subsequent node indicator. In FIG. 5, [3] marked adjacent to the special-purpose label value 10 is an example of the subsequent node indicator.

As illustrated in FIG. 5, the subsequent node indicator [3] may be assigned by referring to the stack index [3] matched with the node 200 loaded in the label stack of the extension header in order to check the position of the topmost label value in the label stack of the extension header.

Unlike the example of FIG. 5, in a case of a maximum label stack having a size of 3, a label stack of an MPLS header 1100 may include label values 200, 400, and 10. In this case, the label value 200 of a subsequent node 200 may be arranged at the topmost of the label stack, and the label value 400 of the node 400 following the node 200 may be arranged beneath the label value 200. The label value 10 may be arranged beneath the label value 400. That is, the label values of the nodes 200, 400, and 600 may be sequentially arranged in the label stack along the forwarding path 700.

In addition, bottom-of-stack information S related to the bottommost label value 10 of the label stack may be set to 1. The bottom-of-stack information is substantially the same as the egress node information described in FIGS. 4A and 4B, and may be a value of field S corresponding to the label value 10 of the MPLS header 1062 illustrated in FIGS. 7A and 7B. FIG. 7B illustrates an MPLS header based on a maximum label stack size different from that in FIG. 5, but other matters except for the maximum label stack size are substantially the same, so the bottom-of-stack information may be described with reference to FIGS. 7A and 7B.

As illustrated in FIG. 5, the extension header may be configured to load all of the label values, i.e., the label values of 200, 400, and 500, which are related to the segment list representing the forwarding path 700. Each label value may be arranged along the forwarding path 700 in the label stack of the extension header. In addition, the stack indexes [0] to [3] may be assigned to match the label values of respective nodes.

Figure 6:
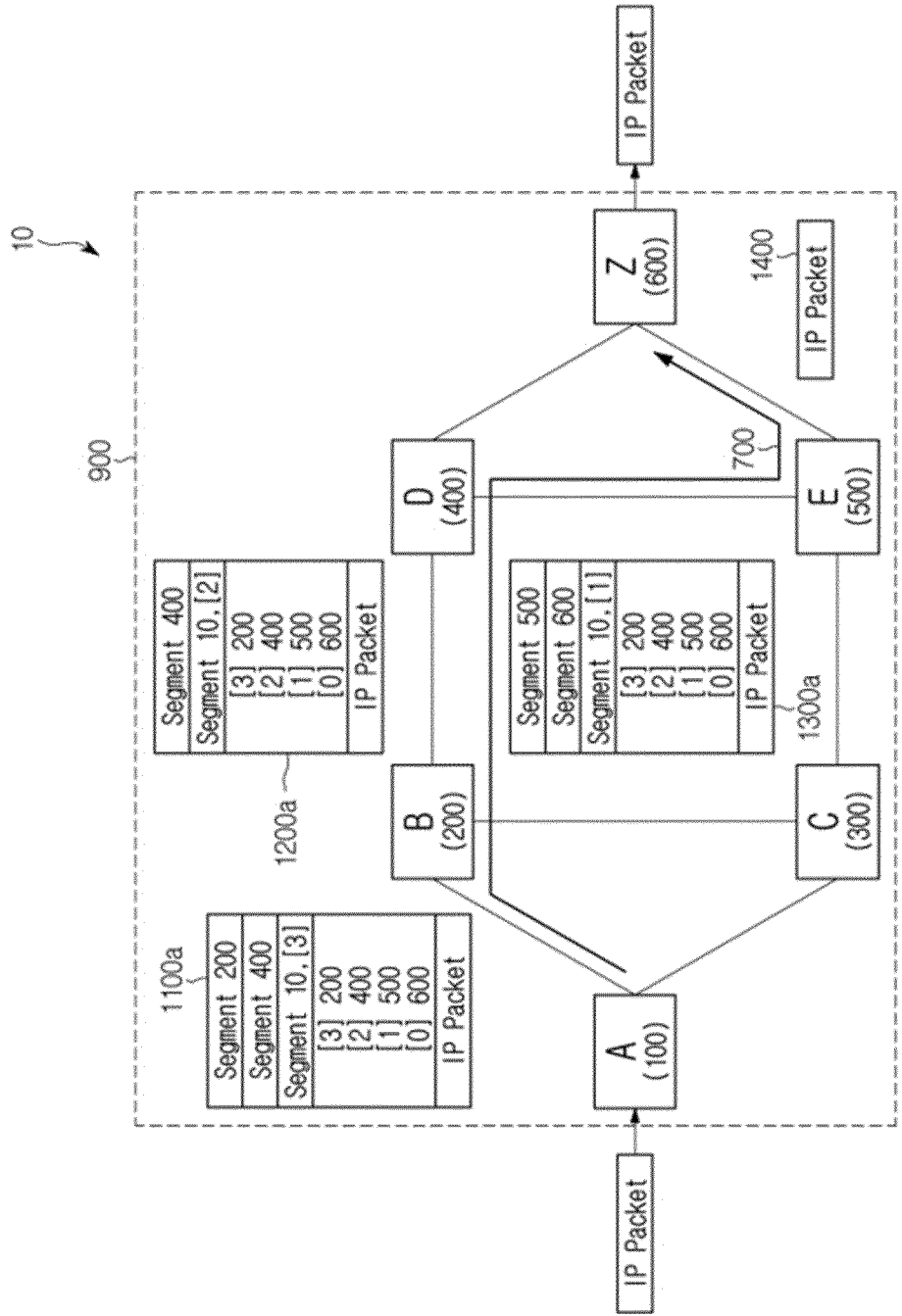
FIG. 6 is a view illustrating generation and processing of the second MPLS packet in the MPLS network when a label stack size of a node is generalized.

FIG. 6 is a view illustrating generation and processing of the second MPLS packet in the MPLS network when the label stack size of a node is generalized.

FIG. 6 is a view illustrating that the generation and processing of the second MPLS packet in FIG. 5 is generalized. FIG. 6 specifically illustrates the generation and processing of an MPLS header and an extension header, each including N label stacks. Here, N is two or more, and the ingress node 100 may determine an N value of actual processable label stack size in consideration of processing capabilities of the label stack of the nodes 100, 200, 400, 500, and 600 on the forwarding path 700.

In FIG. 5, the MPLS header includes two label values. Whereas, in the example of FIG. 6, the ingress node 100 is able to check respective label stack sizes actually processable by the ingress node 100, intermediate node B 200, and intermediate node D 400. Referring to FIG. 6, the ingress node 100 may generate a second MPLS packet 1100a whose label stack size is 3. The intermediate node B 200 may process a second MPLS packet 1200a whose label stack size is 2. Whereas, the intermediate node D 400 may process a second MPLS packet 1300a whose label stack size is 3. The reason is that even though the label stack size allowed for the intermediate node B 200 is 2, the intermediate node B 200 may generate the second MPLS packet 1200a changed through processing of the second MPLS packet 1100a received from the ingress node 100. Specifically, the intermediate node B 200 deletes a label value of the intermediate node B 200 from the MPLS header of the received second MPLS packet 1100a, so that the changed second MPLS packet 1200a may have a label stack whose size is 2. That is, the ingress node 100 is able to add, to the MPLS header thereof, a label stack having a maximum label stack size processable by the nodes 100, 200, 400, 500, and 600 on the forwarding path 700. As another example, the ingress node 100 may add a label stack having a size thereof smaller than the above-described size for a margin of processing traffic and stack of each node.

Meanwhile, by referring to the MPLS header and extension header of the second MPLS packet 1100a received from the ingress node 100, the intermediate node B 200 may process to delete the label value 200 of the receiving intermediate node B from the MPLS header, and keep the label value 400 of the subsequent intermediate node D 400. At the same time, the intermediate node B 200 may process to change a subsequent node indicator related to position indication of a current label value from [3] to [2] by referring to the stack indexes of the extension header. The intermediate node B 200 may select an output interface to the intermediate node D 400 on the basis of the second MPLS packet 1200a changed through the above process, and forward the second MPLS packet 1200a to the intermediate node D 400.

Referring to FIG. 6, since the ingress node 100 already includes the label values 200, 400, and 10 corresponding to the label stack size of 3, the intermediate node B 200 does not need to perform a process of adding the label value 400 of the subsequent intermediate node D 400. In contrast, referring to FIG. 5, since the ingress node 100 merely includes the label values 200 and 10 corresponding to the label stack size of 2, the intermediate node B 200 should perform the process of adding the label value 400 of the subsequent intermediate node D 400. Accordingly, in the example of FIG. 6, a task processed by the intermediate node B 200 may be simplified compared to that in FIG. 5. Consequently, in the ingress node 100, when a label stack is constructed with a label stack size that may accommodate label values of adjacent subsequent nodes and a series of other nodes, at least a changing task of a second MPLS packet in subsequent nodes may be simplified.

The intermediate node D 400 may delete the label 400 from the second MPLS packet 1200 received from the intermediate node B 200. At the same time, the intermediate node B 400 may process to change a subsequent node indicator from [2] to [1] by referring to the stack index of the extension header. The intermediate node D 400 may check whether a subsequent node is the egress node by referring to the changed subsequent node indicator. When the subsequent node corresponds to an intermediate node other than the egress node, a label value of the intermediate node does not exist, so a label value needs to be added. As a result, according to the label stack size of the intermediate node D 400, changing an MPLS header may be performed by adding the respective label values 500 and 600 for the subsequent node and the egress node to the MPLS header. The intermediate node D 400 may forward the second MPLS packet 1300 of which the MPLS header is changed to the intermediate node E 500.

Figure 7A:
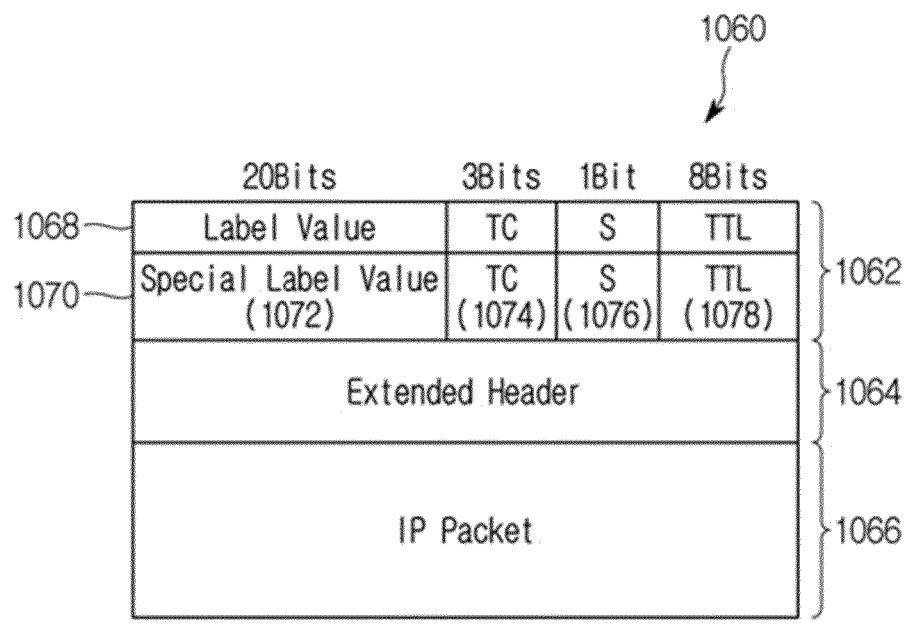
FIG. 7A is a view illustrating a structure of the second MPLS packet.
Figure 7B:
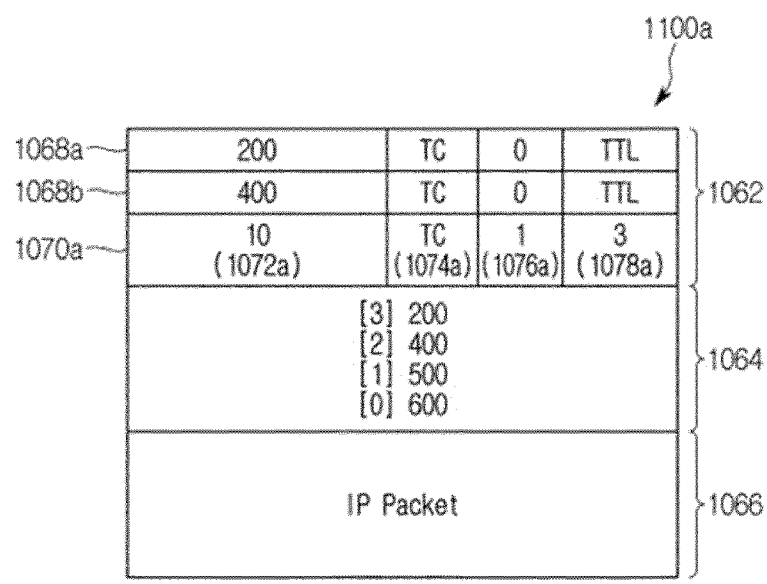
FIG. 7B is a view illustrating a specific example of the second MPLS packet generated by an ingress router in FIG. 6.

FIG. 7A is a view illustrating a structure of the second MPLS packet.

Describing a second MPLS packet 1060 with reference to FIG. 7A in detail, the second MPLS packet 1060 may be composed of an MPLS header 1062, an extension header 1064, and an IP packet 1066.

The MPLS header 1062 may have a label stack entry 1068 and additional label stack entry 1070, which are related to nodes along a forwarding path. The label stack entry 1068 and the additional label stack entry 1070 may be allocated according to a label stack size processable by each node. Accordingly, the MPLS header 1062 may have a part of a label stack allocated according to a maximum label stack size. A label value of the label stack may have a mapping relationship with a segment. As described above, the ingress node 100 may add the label stack having the size smaller than or equal to the maximum label stack size to the MPLS header 1062. Although FIG. 7A illustrates the number of the label stack entry 1068 is 1, a plurality of label stack entries 1068 may be loaded according to the maximum label stack size. Each intermediate node may change an MPLS header thereof, so as to delete a label value of the receiving intermediate node, and to keep a label stack or add a label value to the label stack within a range of the maximum label stack size or less.

The label stack entry 1068 may be configured to include: individual label values constituting a label stack according to a forwarding path; and forwarding control information. The label values of nodes may be arranged along the forwarding path in the label stack. The forwarding control information may include traffic class information TC, egress node information in the label stack, and time-to-live information of a node. An IP packet 1066 may include, for example, payload data and an IP header. The above-described information, data, and header are substantially the same as those in FIG. 4A, so detailed descriptions thereof will be omitted.

An additional label stack entry 1070 may be provided with an additional label stack 1072 and forwarding control information 1074, 1076, and 1078. Here, the MPLS header 1062 of the second MPLS packet 1060 has a different aspect from the MPLS header 1052 of the first MPLS packet 1050. Specifically, the MPLS header 1062 of the second MPLS packet 1060 may be configured to include an additional label stack entry 1070 related to the additional label stack 1072 at the bottommost, instead of an entry related to a label value of the egress node 600.

Specifically, the additional label stack entry 1070 may be provided with the additional label stack 1072 and the forwarding control information 1074, 1076, and 1078. The additional label stack 1072 may be set to a value indicating the existence of an extension header 1064, that is, an additional label value. For example, the additional label stack 1072 may be set to a label value indicating special purpose use. As a specific example, the additional label stack 1072 may be assigned with a base special-purpose label value defined by the IETF. The additional label stack 1072 may allow the intermediate nodes 200 to 500 to identify that when an MPLS packet is received, the MPLS packet is a second MPLS packet 1060 including the extension header 1064.

The forwarding control information may include traffic class information TC 1074, bottom-of-stack information S 1076, and additional time-to-live information TTL 1078, which are similar to corresponding fields of the label stack entry 1068. The same bits as those of the corresponding fields of the label stack entry 1068 may be allocated to the forwarding control information of the additional label stack entry 1070. The bottom-of-stack information 1076 may indicate that an additional label value in the label stack of the MPLS header 1062 corresponds to a last label value, e.g., a bottommost label value. The traffic class information 1074 and the additional time-to-live information 1078 may represent various types of information individually or in combination thereof. This will be described later with reference to FIG. 7B.

The extension header 1064 may be generated by referring to the segment list generated in step S115. The extension header may be configured to have a label stack including all the nodes of the forwarding path related to the segment list. The extension header may be configured such that label values are arranged according to the forwarding path in the label stack of the extension header. As illustrated in FIG. 7B, stack indexes [0] to [3] may be assigned to match label values 600, 500, 400, and 200 of the extension header 1064. As described above, the stack indexes may be referred to when a subsequent node indicator in an intermediate node is changed.

For easier understanding, the structure of the second MPLS packet 1100a illustrated in FIG. 6 will be mainly described with reference to FIG. 7B. FIG. 7B is a view illustrating a specific example of the second MPLS packet generated by the ingress router in FIG. 6. FIGS. 6 and 7B illustrate the case in which the maximum label stack size is 3.

According to the maximum label stack size of 3, the MPLS header 1062 of the second MPLS packet may include: 200 and 400, which represent a part of the label stack selected from among the entire label stacks 200-400-500-600 illustrated in FIG. 6; and 10, which represents an additional label stack 1072. A label stack entry 1068a corresponding to the label value 200 related to the intermediate node B may be allocated at the topmost of the MPLS header 1062. The topmost label value may be related to a subsequent node to which the second MPLS packet 1100a is to be forwarded along the forwarding path 700. To correspond to the selected label value, the label value 400 of the intermediate node D corresponding to a label stack entry 1068b may be assigned beneath the label value 200. Since the intermediate node B 200 and the intermediate node D 400 are not the egress node, egress node information S corresponding to the label values of the intermediate nodes B 200 and D 400 may be displayed as 0 in the label stack entries 1068a and 1068b. S=0 may indicate that the label values of intermediate nodes B 200 and D 400 are not at the bottommost of the label stack.

The bottommost label value related to the additional label stack 1072 in the additional label stack entry 1070a of the MPLS header 1062 may be set to, for example, a label value of 10 indicating special-purpose use other than packet forwarding use. In addition, the bottom-of-stack information 1076a S corresponding to the above label value may be set to 1. S=1 may indicate that the label value is at the bottommost position in the label stack.

The range of base special-purpose label values defined by the IETF is 0 to 15, and a range of unassigned label values may be 4 to 6 and 8 to 12. In FIG. 7B, the special-purpose label value is set to 10, but when a value other than 10 is standardized, there is no problem that the standardized value is used as well.

Meanwhile, values assigned to a traffic class TC and time-to-live information TTL in the label stack entries 1068a and 1068b of the MPLS header 1062 and a processing method of the values may use, for example, a method applied to a typical MPLS network. As another example, values assigned to a traffic class TC and time-to-live information TTL and a processing method of the values may be defined in advance at the ingress node, intermediate nodes, and egress node.

In addition to this, individual values or a value in combination thereof of the traffic class information TC 1072a and additional time-to-live information TTL 1078a in an additional label stack entry 1070a placed at the bottommost may be used to identify which label of an extension header matches the topmost label value of the MPLS header 1062. The traffic class information 1074 and the additional time-to-live information 1078 may serve as at least one of transmission type information and a subsequent node indicator, either individually or in combination thereof. The transmission type information may define a packet transmission method and application fields related to network services.

Describing an example related to the subsequent node indicator, TTL=3 is set in the additional label stack entry 1070a, and such a TTL value may indicate a position of the extension header 1064 corresponding to the topmost label value of the MPLS header 1062, i.e., the label value of the extension header 1064. Specifically, the TTL value of 3 may indicate that the topmost label value is 200, which is the third label value of the extension header 1064.

In addition, the additional time-to-live information 1078a may be changed by referring to stack indexes in the course of passing the intermediate nodes 200, 400, and 500. In FIG. 7B, the stack indexes are exemplified by indexes [0] to [3] written together with respective label values of the extension header 1064. However, the additional label stack 1072a and the traffic class information TC 1074a may remain unchanged in the course of passing the intermediate nodes. In this case, at least one of the additional time-to-live information 1078a and the traffic class information TC 1074a may serve as a subsequent node indicator.

According to the example of FIG. 7B, the traffic class information TC 1074a and the additional time-to-live information 1078a (i.e., a value assigned to TTL of FIG. 7A) may respectively have sizes of 3 bits and 8 bits. The traffic class information TC 1074a and the additional time-to-live information TTL 1078a may be set individually or in a combination thereof. Accordingly, the traffic class information TC 1074*a* and the additional time-to-live information TTL 1078*a* may indicate information including: a forwarding state of the second MPLS packet 1100*a*, information related to the extension header 1064, or applied application fields. That is, the pieces of information 1074*a* and 1078*a* may serve as transmission type information. For example, the application fields, which may be indicated through the traffic class information TC 1074*a* and additional time-to-live information TTL 1078*a* of the second MPLS packet 1100*a*, include OAM, segment routing, network programming, and the like, and other fields may also be indicated.

Referring to FIG. 7B as an example, when a special label value is 10 and bottom-of-stack information BoS 1076*a* is 1, the traffic class information TC 1074*a* may be used to indicate transmission type information such as segment routing, network programming, OAM processing, or the like. When the traffic class information TC 1074*a* is a value indicating the segment routing, the additional time-to-live information TTL 1078*a* may be used to indicate the index of the topmost label. When the traffic class information TC 1074*a* is a value indicating transmission type information other than the segment routing, the additional time-to-live information TTL 1078*a* may be configured to serve in accordance with a defined value of the traffic class information 1074*a*. The extension header 1064 of the second MPLS packet 1100*a* may have all the label values in the label stack to include path information through which a packet passes from the ingress node 100 to the egress node 600.

Referring back to FIG. 2, in a case where the MPLS header and extension header are unable to be added to the IP packet in step S140, the ingress node 100 may discard the IP packet in step S150.

The exemplary embodiment of FIG. 2 includes a process of re-establishing a forwarding path by referring to the label stack size actually processable by the nodes, that is, includes steps S130 and S135. However, in the modified example of FIG. 2, the process of re-establishing the forwarding path may be omitted and the process of generating the first and second MPLS packets may also be performed.

According to the present disclosure, the MPLS label stack size processable by the nodes on the packet forwarding path is pre-checked, and is applied to determine whether to add the MPLS extension header on the basis of the pre-checking result, thereby preventing packet forwarding failures in advance that may occur in the process of forwarding the MPLS packet in the segment routing-based MPLS network.

Figure 8:
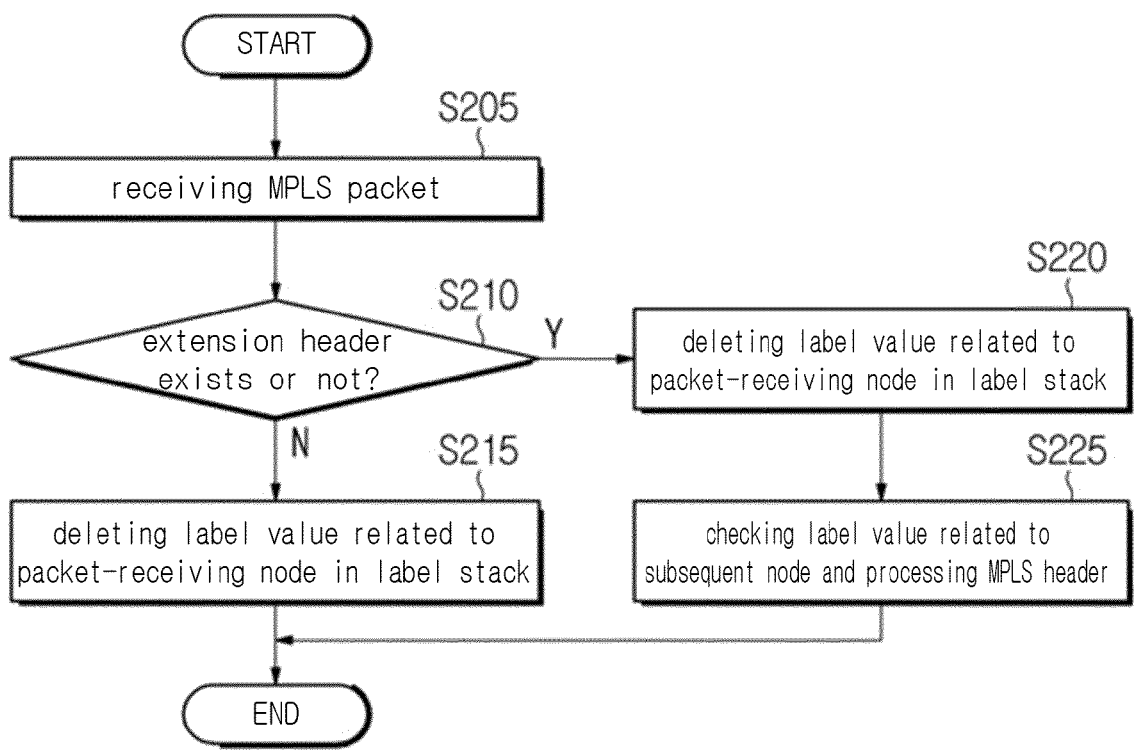
FIG. 8 is a flowchart of a segment routing-based MPLS packet forwarding method performed in intermediate routers according to another exemplary embodiment of the present disclosure.

Referring to FIGS. 3, 5, 6, and 8, an MPLS network-based segment routing method performed in intermediate routers according to another exemplary embodiment of the present disclosure will be described. FIG. 8 is a flowchart of the MPLS network-based segment routing method performed in the intermediate routers according to another exemplary embodiment of the present disclosure.

Referring to FIG. 8, in step S205, each intermediate node 200, 400, and 500 (hereinafter, abbreviated as "intermediate node") on a forwarding path 700 may receive MPLS packets 1010 to 1030 or 1100 to 1300.

Next, in step S210, the intermediate nodes 200, 400, and 500 may check whether extension headers 1064 exist in the respective MPLS packets 1010 to 1030 or 1100 to 1300, so as to identify that the MPLS packets are first MPLS packets 1010 to 1030 or second MPLS packets 1100 to 1300.

For example, each of the intermediate nodes 200, 400, and 500 may check whether an additional label stack 1072 exists in an MPLS header 1052 or 1062. As a result of checking, when there is no additional label stack 1072, each of the intermediate nodes 200, 400, and 500 may recognize the existence of the extension header 1064 and identify a received MPLS packet as the first MPLS packets 1010 to 1030. When there is an additional label stack 1072, each of the intermediate nodes 200, 400, and 500 may recognize that the extension header 1064 does not exist and identify a received MPLS packet as the second MPLS packets 1100 to 1300.

In a case of being identified as the first MPLS packets 1010 to 1030, each intermediate node 200, 400, and 500 may process to delete a received label value of each of the intermediate nodes 200, 400, and 500 in the label stack of the MPLS header 1052 included in each of the first MPLS packets 1010 to 1030 in step S215.

Referring to FIG. 3 as an example, when the first MPLS packet 1010 is received from an input interface, the intermediate node B 200 may delete a label value related to a segment value 200 from the MPLS header 1052. The MPLS header 1052 may be processed to keep label values 400-500-600 related to a series of nodes including subsequent nodes. Accordingly, the intermediate node B 200 may convert the packet received from the ingress node 100 into the first MPLS packet 1020 including the changed MPLS header 1052. The intermediate node B 200 may select an output interface corresponding to the label value 400 by referring to the changed MPLS header 1052, and forward the first MPLS packet to the intermediate node D 400. The intermediate node D 400 and the intermediate node E 500 may also perform the above-described procedure in the same manner.

Meanwhile, as shown in FIG. 3, in a case where an intermediate node is the intermediate node E 500 in front of the egress node 600, the intermediate node E 500 may process to delete the label value 500 in the MPLS header 1052 of the received first MPLS packet 1030. In addition, the intermediate node E 500 may select an output interface corresponding to the label value (the segment value) 600 of the egress node 600. Through egress node information S=1, the intermediate node E 500 may recognize that the label value 600 is the last value of the segment list and that a subsequent node is the egress node 600. The intermediate node E 500 may remove the MPLS header 1064 by deleting the label value 600. The intermediate node E 500 may forward the IP packet to the egress node 600 through the selected output interface. The egress node 600 may forward the IP packet by referring to a final destination address of the IP packet.

Meanwhile, in a case where the MPLS packet received in step S210 is identified as each of the second MPLS packets 1100 to 1300, the intermediate nodes 200, 400, and 500 may process to delete the received label values of the intermediate nodes 200, 400, and 500 in the respective label stacks of the MPLS headers 1062 included in the second MPLS packets 1100 to 1300 in step S220. Describing FIG. 5 as an example, when the second MPLS packet 1100 is received from the input interface, the intermediate node B 200 may process to delete the label value (the segment value) 200 from the MPLS header 1062. The intermediate node D 400 and the intermediate node E 500 may also perform the above-described procedure in the same manner.

Next, in step S225, each intermediate node 200, 400, and 500 may check a label value related to a subsequent node by referring to its MPLS header 1062 and extension header 1064, and process the MPLS header 1062 according to the checked label value.

Describing FIG. 5 as an example, the intermediate node B 200 may add the label value 400 of the intermediate node D 400 corresponding to its subsequent node to the topmost of its label stack by referring to the stack indexes of the extension header 1064. In addition, the intermediate node B 200 may continue to keep the additional label value 10 at the bottommost of the label stack. In addition, by referring to the stack indexes, the intermediate node B 200 may change a subsequent node indicator indicating the position of the topmost label value 400 (e.g., additional time-to-live information TTL 1078a of FIG. 7B) to [2]. As a result, the MPLS header 1062 is changed, whereby the second MPLS packet 1200 may be changed. The extension header 1064 may remain continuously in a state of being loaded with the label stacks 200-400-500-600. The intermediate node B 200 may select an output interface corresponding to the label value 400 and forward the changed second MPLS packet 1200 to the intermediate node D 400. The intermediate node D 400 may perform the same procedure as described above.

In FIG. 6, which is an exemplary embodiment different from FIG. 5, the intermediate node B 200 may process to continuously keep, in the label stack, the label value 400 of the intermediate node D 400 corresponding to the subsequent node by referring to the stack index of the extension header 1064. In the exemplary embodiment of FIG. 6, the subsequent node indicator may be changed in the similar manner as in FIG. 5. As a result, the MPLS header 1062 is changed, whereby the second MPLS packet 1100a may be changed.

That is, each of the intermediate nodes 200 and 400 may process to cause the label stack of the MPLS header 1062 to have the label values related to the subsequent nodes on the forwarding path 700 on the basis of its label stack size processable by the corresponding intermediate nodes and the label stack of the extension header 1064.

Meanwhile, as shown in FIG. 5, in a case where an intermediate node is the intermediate node E 500 in front of the egress node 600, the intermediate node E 500 may delete the label value 500 from its MPLS header 1062 of a received second MPLS packet 1300, and select an output interface corresponding to the label value 600 related to its subsequent node. Through bottom-of-stack information 1076a, which is S=1, and/or a stack index [0], the intermediate node E 500 may recognize that the label value 600 is the last value of the segment list and the subsequent node is the egress node 600. The intermediate node E 500 may remove the MPLS header 1062 by deleting the label value 600. In addition to this, the intermediate node E 500 may delete the extension header 1064. The intermediate node E 500 may forward the IP packet to the egress node 600 through the selected output interface. The egress node 600 may forward the IP packet by referring to a final destination address of the IP packet.

According to the present disclosure, each intermediate node may load the label values, corresponding to the processable label stack size thereof, into the label stack thereof. Therefore, the packet forwarding processing of the intermediate nodes may be speeded up. Furthermore, according to the present disclosure, the packet forwarding method may be dynamically determined by referring to allowable values (i.e., the processable label stack size or the number of label stacks) of each of the nodes participating in the forwarding path.

Exemplary methods of the present disclosure are presented as a series of operations for clarity of explanation, but this is not intended to limit the order in which steps are performed, and when required, each step may be performed concurrently or in a different order. In order to implement the method according to the present disclosure, other steps may be included in addition to the exemplified steps, other steps may be included except for some steps, or additional other steps may be included except for some steps.

The various exemplary embodiments of the present disclosure are intended to describe representative aspects of the present disclosure, rather than listing all possible combinations, and matters described in the various exemplary embodiments may be applied independently or in combination of two or more.

In addition, various exemplary embodiments of the present disclosure may be implemented by hardware, firmware, software, a combination thereof, etc. The implementation by hardware may be realized by means of one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), general-purpose processors (i.e., general processors), controllers, microcontrollers, microprocessors, or the like.

The scope of the present disclosure includes: software or machine-executable instructions (e.g., operating systems, applications, firmware, programs, etc.) that cause operations according to the methods of various exemplary embodiments to be executed on a device or computer; and a non-transitory computer-readable medium in which such software or instructions are stored and executable on the device or computer.

What is claimed is:

1. A segment routing-based MPLS packet forwarding method, comprising:
    establishing a forwarding path in a Multiple Protocol Label Switching (MPLS) network by receiving a packet;
    checking whether processing of a size of a label stack related to each node included in the forwarding path is available or not in each node;
    generating a first MPLS packet by adding an MPLS header having the label stack to the packet in response to availability of the processing; and
    generating a second MPLS packet by adding an extension header having the label stack and by adding an MPLS header having a part of the label stack allocated according to the label stack size processable by each node to the packet in response to unavailability of the processing.

2. The segment routing-based MPLS packet forwarding method of claim 1, wherein each of the MPLS headers of the first and second MPLS packets is configured such that a label value of each node is arranged along the forwarding path in the label stack of each MPLS header, and
    the extension header is configured such that the label value is arranged along the forwarding path in the label stack of the extension header.

3. The segment routing-based MPLS packet forwarding method of claim 1, wherein each of the MPLS headers of the first and second MPLS packets is configured to comprise:
    the label stack loaded for each MPLS header; and
    forwarding control information having egress node information of the label stack and time-to-live information of each node.

4. The segment routing-based MPLS packet forwarding method of claim 1, further comprising:
    determining whether re-establishment of the forwarding path is available on the basis of the label stack size processable by each node in response to the unavailability of the processing;

generating the first MPLS packet by re-establishing the forwarding path in response to availability of the re-establishment; and generating the second MPLS packet in response to unavailability of the re-establishment.

5. The segment routing-based MPLS packet forwarding method of claim 1, further comprising:

determining whether the generating of the second MPLS packet is available before the generating of the second MPLS packet; and discarding the packet in response to unavailability of the generating of the second MPLS packet.

6. The segment routing-based MPLS packet forwarding method of claim 1, further comprising:

forwarding any one of the first and second MPLS packets along each intermediate node on the forwarding path, and receiving to process any one MPLS packet by each intermediate node, wherein the processing of the MPLS packet comprises:

checking, by each intermediate node, whether the extension header exists in the received MPLS packet;

processing the first MPLS packet, so as to delete a label value of each intermediate node receiving the first MPLS packet within the label stack of the MPLS header included in the first MPLS packet in response to absence of the extension header; and processing the second MPLS packet, so as to delete a label value of each intermediate node receiving the second MPLS packet within the label stack of the MPLS header by referring to the MPLS header included in the second MPLS packet in response to existence of the extension header.

7. The segment routing-based MPLS packet forwarding method of claim 6, wherein the processing of the second MPLS packet comprises:

processing to have a label value related to a subsequent node on the forwarding path in the label stack of the MPLS header on the basis of the label stack size processable by each receiving intermediate node and the label stack of the extension header.

8. The segment routing-based MPLS packet forwarding method of claim 6, wherein the processing of the second MPLS packet further comprises:

adding, to the MPLS header, a subsequent node indicator related to a next intermediate node along the forwarding path; and changing the subsequent node indicator so as to indicate a subsequent node on the forwarding path.

9. The segment routing-based MPLS packet forwarding method of claim 8, wherein the subsequent node indicator is changed by referring to stack indexes matching the respective nodes loaded in the label stack of the extension header.

10. The segment routing-based MPLS packet forwarding method of claim 6, wherein the generating of the second MPLS packet further comprises adding forwarding control information and an additional label stack indicating the existence of the extension header, the forwarding control information comprises traffic class information, bottom-of-stack information representing that the additional label stack corresponds to a last stack, and additional time-to-live information, and the traffic class information and the additional time-to-live information serve as at least one of transmission type information and a subsequent node indicator individually or in combination thereof.

11. An ingress router of an MPLS network, the ingress router comprising:

an ingress transceiver configured to receive a packet and forward an MPLS packet generated based on the packet; and an ingress processor configured to process the packet and the MPLS packet, wherein the ingress processor is configured to establish a forwarding path in the Multiple Protocol Label Switching (MPLS) network by receiving the packet, check whether processing of a size of a label stack related to each node included in the forwarding path is available or not in each node, generate a first MPLS packet by adding an MPLS header having the label stack to the packet in response to availability of the processing, and generate a second MPLS packet by adding an extension header having the label stack and by adding an MPLS header having a part of the label stack allocated according to the label stack size processable by each node to the packet in response to unavailability of the processing.

12. The ingress router of claim 11, wherein each of the MPLS headers of the first and second MPLS packets is configured such that a label value of each node is arranged along the forwarding path in the label stack of each MPLS header, and the extension header is configured such that the label value is arranged along the forwarding path in the label stack of the extension header.

13. The ingress router of claim 11, wherein each of the MPLS headers of the first and second MPLS packets is configured to comprise:

the label stack loaded for each MPLS header; and forwarding control information having egress node information of the label stack and time-to-live information of each node.

14. The ingress router of claim 11, wherein the ingress processor is configured to further comprise processes to determine whether re-establishment of the forwarding path is available on the basis of the label stack size processable by each node in response to the unavailability of the processing, generate the first MPLS packet by re-establishing the forwarding path in response to availability of the re-establishment, and generate the second MPLS packet in response to unavailability of the re-establishment.

15. The ingress router of claim 11, wherein the ingress processor is configured to further comprise processes to determine whether the generating of the second MPLS packet is available before the generating of the second MPLS packet and discard the packet in response to unavailability of the generating of the second MPLS packet.

16. An intermediate router provided between an ingress node and an egress node in an MPLS network, the intermediate router comprising:

an intermediate transceiver configured to transmit and receive an MPLS packet; and an intermediate processor configured to process the MPLS packet, wherein the intermediate processor is configured to check whether an extension header exists in a received MPLS packet in order to identify whether the received MPLS packet is a first MPLS packet or a second MPLS packet, process the first MPLS packet, so as to delete a label value of each intermediate node in a label stack of an MPLS header included in the first MPLS packet in response to identifying of the first MPLS packet in which the extension header is absent, and process the second MPLS packet, so as to delete a label value of each intermediate node in a label stack of an MPLS header by referring to the MPLS header included in the second MPLS packet in response to identifying of the second MPLS packet in which the extension header is present, the MPLS header of the first MPLS packet has the label stack allocated with a size of the label stack related to each node included in a forwarding path, the MPLS header of the second MPLS packet comprises a part of the label stack allocated according to the label stack size processable by each node, and the extension header has the label stack.

17. The intermediate router of claim 16, wherein the processing of the second MPLS packet further comprises processing to have the label value related to a subsequent node on the forwarding path in the label stack of the MPLS header on the basis of the label stack size processable by each receiving intermediate node and the label stack of the extension header.

18. The intermediate router of claim 16, wherein the second MPLS packet is configured such that a subsequent node indicator related to a next node along the forwarding path is further added to the MPLS header by the ingress node, and the processing of the second MPLS packet further comprises changing the subsequent node indicator so as to indicate the subsequent node on the forwarding path.

19. The intermediate router of claim 18, wherein the subsequent node indicator is changed by referring to stack indexes matching the respective nodes loaded in the label stack of the extension header.

20. The intermediate router of claim 16, wherein the second MPLS packet is configured, by the ingress node, to be added with forwarding control information and with an additional label stack that indicates existence of the extension header, the forwarding control information comprises traffic class information, bottom-of-stack information representing that the additional label stack corresponds to a last stack, and additional time-to-live information, and the traffic class information and the additional time-to-live information serve as at least one of transmission type information and a subsequent node indicator individually or in combination thereof.

* * * * *